April 5, 1927.
G. M. HOWELL
1,623,921
AUTOMATIC CONTROL FOR MOTOR VEHICLES
Filed Oct. 7, 1922
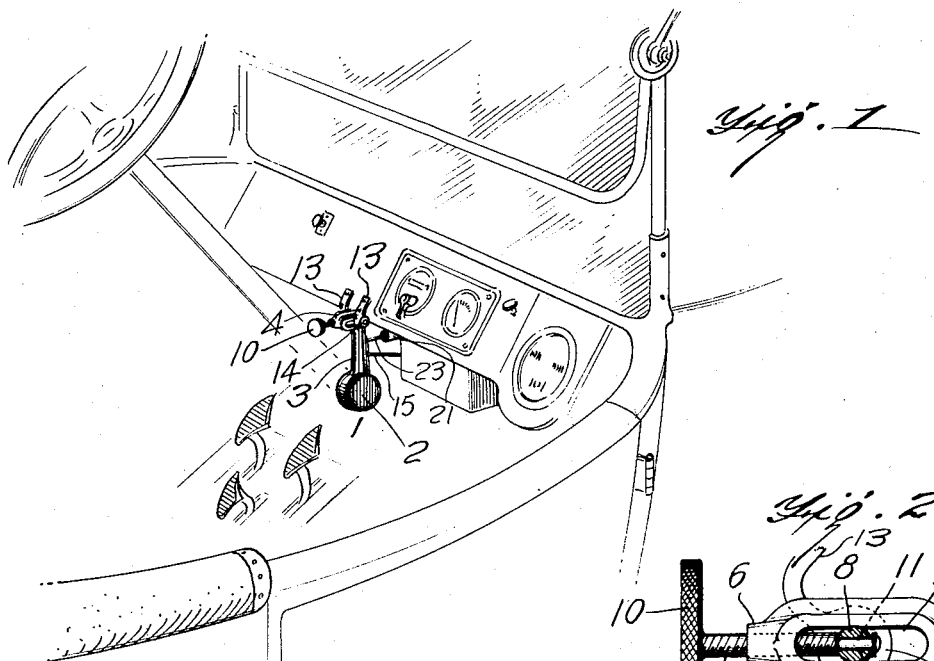
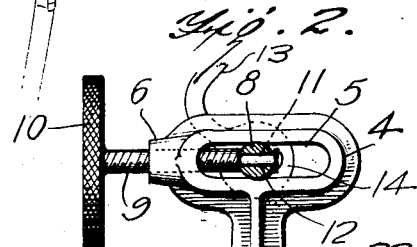
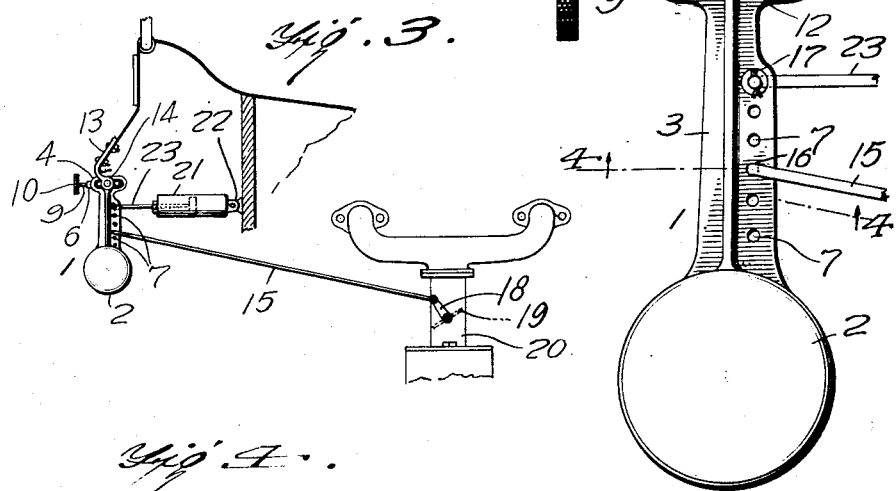
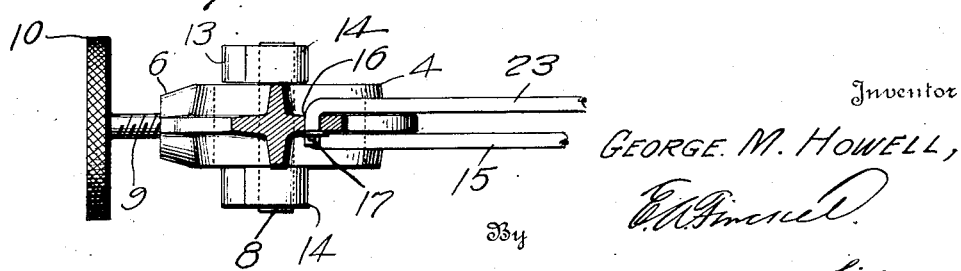
Inventor
GEORGE. M. HOWELL,
By
his Attorney Patented Apr. 5, 1927.

1,623,921

UNITED STATES PATENT OFFICE.

GEORGE M. HOWELL, OF NORTHUMBERLAND, PENNSYLVANIA.

AUTOMATIC CONTROL FOR MOTOR VEHICLES.

Application filed October 7, 1922. Serial No. 593,153.

This invention relates to controls for motor vehicles or automobiles, and particularly to means for automatically controlling the admission of the combustible mixture to the engines of such vehicles.

The object of the invention is to provide a controlling means of the gravity or pendulum-operated type, of simple and economical construction and effective in operation, and which may readily be applied to automobiles already built and in use.

A further and important object of the invention is to provide a control mechanism of this character which may be applied to the dash or instrument board of the vehicle, within sight of and readily accessible by and within reach of the driver when running the vehicle.

And a still further and important object of the invention is to provide means for adjusting the weight or pendulum and the throttle, whereby the controlling positions of the throttle may be varied relatively to the center of gravity of the pendulum and according to the speed and power conditions desired by the driver.

The invention consists in a controlling means for motor vehicle engines, comprising a pendulum adapted to be supported upon the dashboard or other part of the vehicle, means for connecting the pendulum with the throttle of the engine to hold the throttle in predetermined normal running positions when the vehicle is running on a level road, and to move the throttle in opening and closing directions when the vehicle is running up or down grade, respectively, and means for adjusting the pendulum and its connection with the throttle, whereby the position of the throttle relatively to the center of gravity of the pendulum may be changed to maintain the throttle in different normal speed positions.

The invention also consists in the details of construction, combination and arrangement of parts, all substantially as herein set forth and finally claimed.

In the accompanying drawings, illustrating the invention, in the several figures of which like parts are similarly designated, Figure 1, is a perspective view of a portion of an automobile showing the dash and instrument board with the invention applied thereto, Figure 2, is a side elevation, on a larger scale, of the pendulum or weight controller, Figure 3, is a side view showing parts of an automobile with the invention applied thereto, Figure 4, is a horizontal section, taken substantially in the plane of line 4—4, Fig. 2, and looking in the direction of the arrows.

As shown in the drawings, the invention, in its preferred form, and as designed to be used in connection with the ordinary pleasure or passenger automobiles, comprises a weight or pendulum 1, the body of which may be of any suitable shape or design, and preferably of cast metal, but as herein shown, comprises the main weighted portion 2, a ribbed neck portion 3, and an elongated head portion 4, provided with a slot or opening 5, and a projecting boss 6. One of the ribs of the neck portion 3 is provided with a series of holes or perforations 7, for a purpose presently appearing.

Mounted in the slot 5 of the pendulum is a pin 8, of a length sufficient to project beyond the opposite sides of the slot, and threaded into the boss 6 is the screw stem 9 of a hand-wheel 10, the inner end 11 of the stem 9 being reduced and swiveled in a transverse opening 12, in the pin 8, as by upsetting the reduced end of the screw stem, or in any other suitable manner.

Secured to the dash of the vehicle, and preferably to the instrument board, as shown in Figs. 1 and 3, are a pair of brackets 13, having at their lower ends eyes 14, adapted to receive the projecting ends of the pin 8, whereby the pendulum is supported in operative position in front of and readily accessible by the driver of the vehicle.

Loosely connected with the pendulum, is a rod 15, having a right angled end 16 adapted to engage one or the other of the holes 7 in the neck of the pendulum and secured therein by means of a cotter pin 17, or otherwise.

The rod 15 extends through the dashboard, and at its other end is connected in any suitable or usual manner to the operating arm 18 of the throttle 19 in the intake 20 of the engine.

In order to stabilize or prevent undue oscillations of the pendulum, when the vehicle is running over rough or uneven roads, which would tend to disturb the stability and positions of the throttle, a dash-pot, of any usual or ordinary construction, may be connected with the pendulum and to some part of the body of the vehicle, and as shown in Fig. 3, such a dash-pot is provided having its cylinder 21 pivotally hung from the dashboard of the vehicle, as at 22, and its piston rod 23 connected to the uppermost one of the openings 7 in the neck of the pendulum.

The control mechanism as thus described, may readily be installed upon automobiles already built and in use, it being necessary only to make the required changes or alterations in the connections between the pendulum and the throttle, from that herein shown, to adapt the invention to different types of automobiles having different arrangements of engines and different types of carburetors and intakes and control valves therefor, and this may be attained by the use of additional connecting rods and levers to make the suitable and operative connection between the pendulum and the control valve or throttle as the case may require.

In the installation of the mechanism as herein described, and after the parts are in position, the connecting rod 15 is placed in one or the other of the holes 7 in the pendulum, and adjusted from one to the other of such holes and the engine run to determine the proper adjustment of the throttle to maintain the throttle in proper position to attain the desired speed and power, thus setting the automatic control to hold the throttle at the normal predetermined speed position when the vehicle is running on a level road.

When thus installed and adjusted, the operation is as follows:—The machine may be, and as usual is, provided with an ordinary manual throttle control for starting the engine, and this may or may not be used in connection with the automatic control herein, and if maintained on the machine, provision should be made for leaving the manually operated throttle-control in a free and unlocked condition, to permit the operation of the automatic control of this invention. This may be accomplished in various ways. For instance, in the common form of manual control having a spring arm connected to the control rod and adapted to engage a segment on the steering wheel, the spring arm may be bent so as not to engage the segment, and thus leave the manual control valve mechanism free to move, and thus permit the automatic control to operate the valve after the machine has been started, to thereby automatically control the speed and power of the machine in its travel upon level road and up and down grade. However, with the construction herein, the starting of the engine may be accomplished manually by adjusting the pendulum upon its supporting pin 8 by turning hand-wheel 10 to open the throttle to starting position, and after starting, the pendulum may be readjusted to move the throttle to normal or desired speed limit for level road traveling, which may be determined by the speedometer.

In traveling upon a level road, the automatic control will maintain the throttle in required or predetermined speed position, and this may be varied to different limits by adjusting the position of the pendulum upon its supporting pin, by means of the hand-wheel 10, and thus adjusting the position of the throttle relatively to the center of gravity of the pendulum, and maintaining it in a more or less open position. When the vehicle is running up grade, the inclination of the vehicle will swing the pendulum rearwardly, and through the connecting rod 15 will pull the throttle further to open position and admit more fuel to the engine and increase the power of the engine, and when going down grade the action of the pendulum will be reversed and swung forwardly, thus moving the throttle further to closed position or to closed or idling position, and thus decreasing or cutting off the power of the engine.

When the vehicle is in motion and traveling a rough road, the dash-pot 21 will check the vibrations of the pendulum, and thus avoid undue disturbance of the position of the throttle, and maintain a practically uniform flow of gas to the engine.

It will be understood, that the invention is not limited to the specific construction and arrangement of parts herein shown and described, but may be changed in various particulars, and still be within the scope of the following claims.

What I claim is:—

1. An automatic control for motor vehicles, comprising a pivot pin fixed to the vehicle, a pendulum adapted to be pivotally and slidably suspended upon said pivot pin, a rod connecting said pendulum with the throttle of the engine, and means for sliding the pendulum relatively to the pivot pin for adjusting the position of the pendulum upon its pivot to change its center of gravity, whereby the throttle may be adjusted and maintained by the pendulum in different normal or predetermined speed positions.

2. An automatic control for motor vehicles, comprising a pivot pin fixed to the vehicle, a pendulum adapted to be pivotally and slidably suspended upon said pivot pin, a rod connecting said pendulum with the throttle of the engine, and manually operated means for sliding the pendulum relatively to the pivot pin for adjusting the position of the pendulum upon its pivot to change its center of gravity, whereby the throttle may be adjusted and maintained in different positions by the pendulum for obtaining different normal predetermined speeds.

3. An automatic control for motor vehicles, comprising a pivot pin fixed to the vehicle, a pendulum adapted to be pivotally and slidably suspended upon said pivot pin, a rod connecting the pendulum with the throttle of the engine, and manually operated means for sliding the pendulum upon and relatively to the pivot pin located in the vehicle within easy reach of the driver for adjusting the pendulum upon its pivot to change its center of gravity relatively to the position of the throttle, whereby the throttle may be adjusted to different positions and maintained in adjusted position by the pendulum, to obtain different normal or predetermined speeds of the engine, and to permit the pendulum to move the throttle in opening and closing directions when the vehicle is running up or down grade, respectively.

4. An automatic control for motor vehicles, comprising a pivot pin fixed to the dash of the vehicle, a pendulum pivotally and slidably suspended from said pivot pin, a rod connecting the pendulum with the throttle of the engine, manually operated means for slidably adjusting said pendulum upon the pivot pin to shift the center of gravity of the pendulum relatively to the throttle, to move the throttle to different normal or predetermined speed positions, and permitting the pendulum to automatically control the positions of the throttle when the vehicle is running up and down grade.

5. An automatic control for motor vehicles, comprising a pivot pin fixed to the dash of the vehicle, a pendulum having a slotted head adapted to engage and pivotally support said pendulum from said pivot pin, a screw swivelled in said pivot pin and engaging a screwthreaded opening in said head a connection between the pendulum and the throttle, means within ready reach of the driver for operating said screw for moving the pendulum upon its pivot pin to adjust its center of gravity relatively to the throttle to thereby adjust and maintain the throttle in different positions of normal or predetermined speeds and permit the pendulum to automatically control the position of the throttle when running up or down grade.

6. An automatic control for motor vehicles, comprising a pendulum adapted to be pivotally and slidably suspended from the body of the vehicle, means for connecting said pendulum with the throttle operating means of the engine, and means for adjusting the position of the throttle whereby the throttle may be adjusted and maintained by the pendulum in different normal or predetermined speed positions.

7. An automatic speed regulator of the character specified comprising a support, a frame slidable upon the support, a pendulum carried by the frame, connecting means between the pendulum and throttle, and means under control of the driver for adjusting the pendulum frame and holding the same in the required adjusted position.

In testimony whereof I have hereunto set my hand this 7th day of October, 1922.

GEORGE M. HOWELL.